US012683397B2

(12) United States Patent
Kautz et al.

(10) Patent No.: US 12,683,397 B2
(45) Date of Patent: Jul. 14, 2026

(54) METHOD FOR OPERATING A NETWORK MANAGEMENT SYSTEM FOR A LOCAL ENERGY NETWORK DEPENDING ON A STORAGE STRATEGY OF AN ENERGY STORE

(71) Applicant: Siemens Aktiengesellschaft, Munich (DE)

(72) Inventors: Martin Kautz, Erlangen (DE); Sebastian Schreck, Nuremberg (DE); Sebastian Thiem, Neustadt an der Aisch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 489 days.

(21) Appl. No.: 17/760,927

(22) PCT Filed: Jun. 26, 2020

(86) PCT No.: PCT/EP2020/067979
§ 371 (c)(1),
(2) Date: Mar. 16, 2022

(87) PCT Pub. No.: WO2021/052644
PCT Pub. Date: Mar. 25, 2021

(65) Prior Publication Data
US 2022/0344938 A1 Oct. 27, 2022

(30) Foreign Application Priority Data
Sep. 17, 2019 (DE) .................... 10 2019 214 132.3

(51) Int. Cl.
*H02J 3/00* (2026.01)
*H02J 3/14* (2026.01)
*H02J 3/46* (2026.01)

(52) U.S. Cl.
CPC ................ *H02J 3/14* (2013.01); *H02J 3/003* (2020.01); *H02J 3/46* (2013.01)

(58) Field of Classification Search
CPC ...... H02J 3/14; H02J 3/003; H02J 3/46; H02J 2310/60; H02J 2310/14; H02J 3/00;
(Continued)

(56) References Cited

U.S. PATENT DOCUMENTS

2007/0220907 A1 9/2007 Ehlers ............................ 62/126
2013/0151012 A1 6/2013 Shetty .......................... 700/276
(Continued)

FOREIGN PATENT DOCUMENTS

GB 2448896 * 11/2008
GB 2547398 * 8/2017
(Continued)

OTHER PUBLICATIONS

Search Report for International Application No. PCT/EP2020/067979, 11 pages, Oct. 7, 2020.
(Continued)

*Primary Examiner* — Rexford N Barnie
*Assistant Examiner* — Xuan Ly
(74) *Attorney, Agent, or Firm* — Slayden Grubert Beard PLLC

(57) ABSTRACT

Various embodiments of the teachings herein include a method for operating a network management system for a local energy network. The method may include determining a first operating strategy for an energy store of an electrical device of the local energy network based on a decision criterion using an electronic computing device of the network management system. The first operating strategy comprises a flexible storage strategy for storing energy in the energy store, the flexible storage strategy including a predefined flexibility criterion of the electrical device.

14 Claims, 1 Drawing Sheet

(58) Field of Classification Search
CPC ........ Y02A 30/60; Y02A 30/30; Y02B 30/17; Y02B 70/30; Y02B 70/3225; Y02E 20/14; Y04S 20/222; Y04S 20/242; F24D 10/00
USPC .......................................................... 307/19
See application file for complete search history.

(56) References Cited

U.S. PATENT DOCUMENTS

| | | | |
|---|---|---|---|
| 2014/0037275 A1 | 2/2014 | Flohr | 392/464 |
| 2016/0276832 A1 | 9/2016 | Kawai et al. | 700/295 |

FOREIGN PATENT DOCUMENTS

| | | | | |
|---|---|---|---|---|
| JP | 2547398 | * | 8/2017 | |
| KR | 20180080048 A | | 7/2018 | F02B 43/10 |
| SI | 3343496 | * | 7/2018 | |

OTHER PUBLICATIONS

Korean Office Action, Application No. 10-2022-7012160, 4 pages, Dec. 20, 2023.
Patteeuw, Dieter et al., "Comparison of Load Shifting Incentives for Low-Energy Buildings with Heat Pumps to Attain Grid Flexibility Benefits," Applied Energy, 167 (5), pp. 80-92, Feb. 5, 2016.
European Office Action, Application No. 20739888.4, 5 pages, Sep. 13, 2023.

* cited by examiner

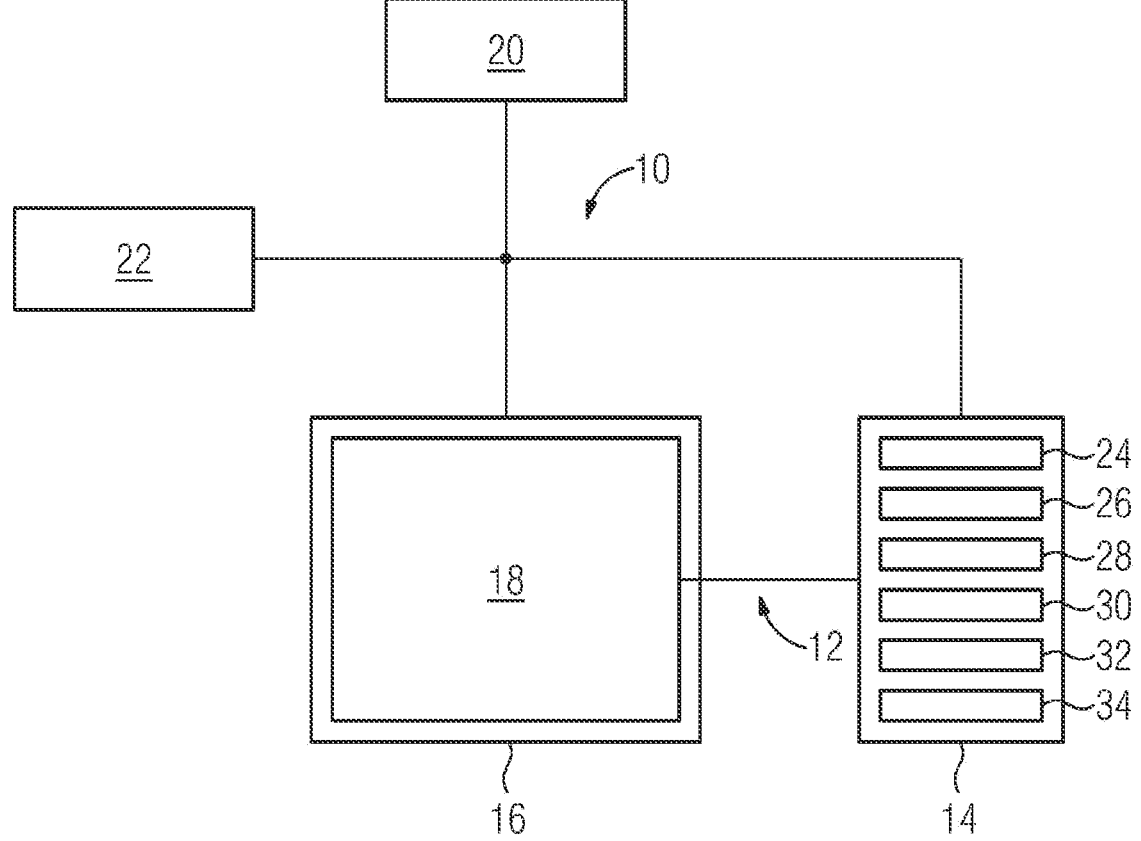

METHOD FOR OPERATING A NETWORK MANAGEMENT SYSTEM FOR A LOCAL ENERGY NETWORK DEPENDING ON A STORAGE STRATEGY OF AN ENERGY STORE

CROSS-REFERENCE TO RELATED APPLICATIONS

This application is a U.S. National Stage Application of International Application No. PCT/EP2020/067979 filed Jul. 26, 2020, which designates the United States of America, and claims priority to DE Application No. 10 2019 214 132.3 filed Sep. 17, 2019, the contents of which are hereby incorporated by reference in their entirety.

TECHNICAL FIELD

The present disclosure relates to energy networks. Various embodiments of the teachings herein may include methods and/or systems for operating a network management system for a local energy network.

BACKGROUND

In some methods for a local energy market, various participants, at their network connection points, can exchange electricity with other participants at other network connection points in an improved manner. In this case, the different participants may have a variety of different technical assemblies, such as, for example, heat pumps or combined heat and power plants. In particular electricity from a superordinate network is used for these, or they can feed in surplus electricity and sell it, for example.

In this respect, for example, there may be so-called commercial agents for the individual participant. If a participant has an extensive, for example complex, energy system with very many technical assemblies and stores, it can improve its energy procurement and its infeed by means of an energy management system and thus determine an improved offer for the local energy market. Simpler participants, such as domestic customers, for example, generally do not have their own energy management system, however. Corresponding methods for a local energy network with a thermal energy store are not known from the prior art.

SUMMARY

The teachings of the present disclosure include methods, computer programs, electronically readable data carriers, and/or network management systems by means of which a local energy network with an energy store can be operated in an improved manner. For example, some embodiments of the teachings herein include a method for operating a network management system (12) for a local energy network (10), in which at least one operating strategy (24, 26, 28, 30, 32, 34) for an energy store (18) of an electrical device (16) of the local energy network (10) is determined depending on a decision criterion by means of an electronic computing device (14) of the network management system (12), characterized in that a flexible storage strategy for storing energy in the energy store (18) is selected as the operating strategy (24, 26, 28, 30, 32, 34) by means of the electronic computing device (14), the storage strategy being determined depending on a predefined flexibility criterion of the electrical device (16) as the decision criterion.

In some embodiments, one operating strategy (24, 26, 28, 30, 32, 34) is selected from a multiplicity of operating strategies (24, 26, 28, 30, 32, 34) for the energy store (18) by means of the electronic computing device (14).

In some embodiments, temporal shifting for consumption of the energy or for utilization of the energy within a predefined time interval is determined in the case of the predefined flexibility criterion.

In some embodiments, a heat pump or a compression refrigeration machine is provided as the electrical device (16) and, depending on the storage strategy, electrical energy for generating energy for the energy store (18) is generated by the heat pump or the compression refrigeration machine by means of electrical energy uptake from the local energy network (10).

In some embodiments, in the case of a first operating strategy (24, 26, 28, 30, 32, 34), the storage strategy is determined in such a way that the energy store (18) has an energy value which is below an overcharging threshold value for the energy store (18) or above an undercharging threshold value for the energy store (18).

In some embodiments, in the case of a second operating strategy (24, 26, 28, 30, 32, 34), the storage strategy is determined in such a way that a predefined energy is stored within a predefined time interval.

In some embodiments, in the case of a third operating strategy (24, 26, 28, 30, 32, 34), the storage strategy is determined in such a way that a predefined energy is stored within a predefined time interval having a multiplicity of time blocks, and within a respective time block.

In some embodiments, in the case of a fourth operating strategy (24, 26, 28, 30, 32, 34), the storage strategy is determined in such a way that a number of the time blocks is determined by means of the electronic computing device (14) on the basis of an optimization method and a predefined energy is stored within a respective time block.

In some embodiments, a combined heat and power plant is provided as the electrical device (16) and, depending on the storage strategy, energy of the energy store (18) is generated for generating electrical energy for the local energy network (10).

In some embodiments, in the case of a first operating strategy (24, 26, 28, 30, 32, 34), the storage strategy is determined in such a way that the combined heat and power plant is operated with heat-based control.

In some embodiments, in the case of a second operating strategy (24, 26, 28, 30, 32, 34), the storage strategy is determined in such a way that a predefined energy is provided within a predefined time interval.

In some embodiments, the case of a third operating strategy (24, 26, 28, 30, 32, 34), the storage strategy is determined in such a way that a predefined energy is provided within a predefined time interval having a multiplicity of time blocks, and within a respective time block.

As another example, some embodiments include a computer program which is loadable directly into a memory of an electronic computing device (14) of a magnetic resonance apparatus, comprising program means for carrying out the steps of the method as described herein when the program is executed in the electronic computing device (14) of the magnetic resonance apparatus.

As another example, some embodiments include an electronically readable data carrier with electronically readable control information which is stored thereon and which comprises at least one computer program as claimed in claim 13 and is configured in such a way that it carries out a method as described herein when the data carrier is used in an electronic computing device (14) of a magnetic resonance apparatus.

As another example, some embodiments include a network management system (12) for a local energy network (10), comprising at least one electronic computing device (14), wherein the network management system (12) is designed for carrying out a method as described herein.

BRIEF DESCRIPTION OF THE DRAWINGS

The disclosure will now be explained in greater detail on the basis of exemplary embodiments and with reference to the accompanying drawing. In this case, the sole FIG. shows a schematic block diagram of a local energy network with an embodiment of a network management system. In the FIG., identical or functionally identical elements are provided with identical reference signs.

DETAILED DESCRIPTION

Various embodiments of the teachings herein may include a method for operating a network management system for a local energy network, in which at least one storage strategy for an energy store of an electrical device of the local energy network is determined depending on a decision criterion by means of an electronic computing device of the network management system. The disclosure describes a flexible storage strategy for storing energy in the energy store is selected as the operating strategy by means of the electronic computing device, the storage strategy being determined depending on a predefined flexibility criterion of the electrical device as the decision criterion.

In some embodiments, a corresponding operating strategy can also be determined for electrical devices or for the local energy network with the energy store, which can be designed for example as a heat pump with hot water store, as a compression refrigeration machine with cold water or ice store, and as a combined heat and power plant and comprises a corresponding hot water store as energy store. In other words, a method for determining offers for the local energy market is determined for the local energy network with the energy store. Improved operation of the local energy network with the energy store may thus be realized by means of the network management system.

In some embodiments, the operating strategy is thus carried out depending on a load profile in the local energy network and a state of the network management system. A kind of marketplace forum for the utilization of the energy within the local energy network is thus utilized. In some embodiments, a thermal energy store can be provided as the energy store. In some embodiments, for example, a water store can also be provided. In particular, a different form of energy than electrical energy, has a different energy mode than electrical energy, is stored in the energy store. By way of example, thermal energy is stored in the thermal energy store. This can for example also analogously be a water store operated with a reverse osmosis installation.

Energy management systems are referred to, and the local energy network can also be referred to as a site energy system. A local energy system can then in turn be formed from a multiplicity of site energy systems. There are thus three levels, in particular. Site energy system—this is operated by an energy management system or operation is optimized. This is e.g. a building, a campus or an airport. Local energy system—comprising a multiplicity of site energy systems connected via an electricity grid and/or district heating network, for example—the individual participants/site energy systems are optimally coordinated by means of a local energy market platform. This is a town/city district, a region or a distribution network, for example.

In some embodiments, one operating strategy is selected from a multiplicity of operating strategies for the energy store by means of the electronic computing device. In particular, by means of the electronic computing device, it is thus possible to select for example from two operating strategies, in particular from three operating strategies, in particular from four operating strategies, in particular from five operating strategies, in particular from six operating strategies. As a result, the energy store can be operated highly flexibly within the local energy network.

In some embodiments, temporal shifting for consumption of the energy or for utilization of the energy within a predefined time interval is determined in the case of the predefined flexibility criterion. In other words, temporal shifting of the consumption of the energy, for example in the case of a combined heat and power plant, or for the utilization of the energy in the case of a heat pump, for example, is carried out. A high flexibility potential of the energy store can be utilized as a result. In some embodiments, by means of the operating strategy, it is possible to determine the electricity within the local energy network for the following day. In particular, this involves a so-called "day ahead" market.

In some embodiments, a heat pump or a compression refrigeration machine is provided as the electrical device and, depending on the storage strategy, electrical energy for generating energy for the energy store is generated by the heat pump or the compression refrigeration machine by means of electrical energy uptake from the local energy network. In particular, the heat pump or the compression refrigeration machine utilizes electricity for generating heat or cold, respectively. An energy store for example in the thermal circuit flexibilizes the possible operation of the heat pump or respectively the compression refrigeration machine in order to cover a thermal load.

In some embodiments, in the case of a first operating strategy, the storage strategy is determined in such a way that the energy store has an energy value which is below an overcharging threshold value for the energy store or above an undercharging threshold value for the energy store. By way of example, this first operating strategy can be referred to as a "conservative operating strategy". The least possible flexibility is offered in the case of the conservative operating strategy. In this case, the thermal load of each time interval, fixedly converted by the coefficient of performance (COP) of the heat pump, this being described in particular by the formula electricity load=thermal load/COP, is transferred to the local electricity market. What can be realized as a result is that the thermal load for each time interval can be covered and the energy store is not in an undercharged or overcharged state.

A so-called "conservative plus operating strategy" can be regarded as a first operating strategy. In this respect, in addition to the fixed thermal load, the energy store (TES) can offer even further flexibility over the entire following day. If the energy store has for example an initial state of charge of 40% and a total capacity of 100 kWh at the beginning of the following day, then over the entire day it is possible additionally also to procure 40%×100 kWh=40 kWh less (40 kWh/COP electricity), since the latter can be covered from the energy store. In some embodiments, however, it is also possible to procure 60 kWh (60 kWh/COP electricity) more heat. That is to say, for example, that it is possible to make a further block offer for buying electricity from 0:00-24:00 hr over 60 kWh/COP of the heat pump with possibly a lower procurement price. If it is then worth procuring electricity at a specific time of the day owing to high renewable infeed and thus lower prices, for example, the energy store can thus be charged by means of the heat pump. The 40 kWh less in terms of potential procurement could also be taken into account in the fixed thermal load curve. In this regard, either the thermal load that has to be covered can be specified as lower for each time interval or the buying of electricity can be reduced for specific time intervals in which high prices for the electricity procurement are presumed. In addition, it can be provided that it is then also possible to set a further block offer for electricity procurement of 40 kWh/COP for the entire day, i.e. in particular from 0:00-24:00 hr.

In some embodiments, in the case of a second operating strategy, the storage strategy is determined in such a way that a predefined energy is stored within a predefined time interval. This second operating strategy can be referred to as a "risky operating strategy", for example. Assuming that the flexibility made available by the energy store is sufficient, in particular sufficient for any conceivable scenario, it is also possible simply to set only the entire quantity of heat required as a block offer on the local energy market as a procurement offer. That is to say that, if a total of 100 kWh heat are required on one day, for example, these 100 kWh divided by an average COP of the heat pump as electricity procurement from 0:00-24:00 hr can be submitted as a block offer. The block offer can mean, in particular, that the local electricity market platform, during the coordination of the individual participants, is then permitted to shift the procurement of the heat pump temporarily within the block within the boundary conditions, for example maximum procurement power. In this case, the maximum procurement power can be restricted, for example by a maximum performance of the heat pump. In the case of energy stores with excessively small dimensioning, this offer can result in temporary overcharging or undercharging of the store.

In some embodiments, in the case of a third operating strategy, the storage strategy is determined in such a way that a predefined energy is stored within a predefined time interval having a multiplicity of time blocks, and within a respective time block.

A "risky plus operating strategy" can also be chosen in addition to the risky operating strategy. The risky operating strategy can also be extended by the initial state of the energy store also being concomitantly included as an offer. The risky plus operating strategy should then be regarded in a similar way to the conservative plus operating strategy.

In some embodiments, in the case of a third operating strategy, the storage strategy is determined in such a way that a predefined energy is stored within a predefined time interval having a multiplicity of time blocks, and within a respective time block. This strategy can be referred to as a "block operating strategy", for example. By way of example, a user of the network management system can select whether said user would prefer to submit block offers for one day. In this regard, instead of in the risky strategy for the entire day from 0:00-24:00 hr, for n=2 blocks, for example, it is possible to submit respectively an offer from 0:00-12:00 hr and an offer from 12:00-24:00 hr. If the number of block offers is equal to 1, then this method corresponds to the risky operating strategy, in particular. If the number of blocks is equal to the number of time intervals for the next day, then the method corresponds to the conservative operating strategy, in particular. The advantage of this method is that overcharging or undercharging of the energy store is reduced or avoided. An optimum number of blocks could also be estimated from the storage capacity of the energy store. If the storage capacity of the energy store is five times greater than the maximum performance of the heat pump, for example, then it is not necessary to create an individual block and an individual offer for each time interval.

In some embodiments, in the case of a fourth operating strategy, the storage strategy is determined in such a way that a number of the time blocks is determined by means of the electronic computing device on the basis of an optimization method and a predefined energy is stored within a respective time block. This can be an "optimized block selection operating strategy", for example. In particular, this method or this operating strategy mediates the best trade-off between risk and performance, i.e. cost savings of the local network management system. In this case, an optimization problem is formulated for the block selection. The participant can still determine the number of blocks in accordance with said participant's individual risk perception. These blocks now have flexible limits, however, which are optimized, that is to say that the start and end times of the blocks are variable. For each block, the method then determines what would be the worst possible result, i.e. to what extent storage boundary conditions are exceeded. The sum of these exceedances of the storage boundary conditions of each block is then minimized in an optimization problem. The previously defined number of blocks is thereby distributed over the following day such that there is the lowest risk regarding non-fulfillment, but the greatest possible flexibility and thus also the greatest possible return can also be achieved.

In some embodiments, a combined heat and power plant is provided as the electrical device and, depending on the storage strategy, energy of the energy store is generated for generating electrical energy for the local energy network. In other words, it is provided that the combined heat and power plant generates electricity and heat using a fuel. The energy store can be incorporated into the operation of the combined heat and power plant and thus flexibilize the operation. Instead of electricity procurement as in the case of the heat pump, for example, the main emphasis is now on the electricity provision of the combined heat and power plant. Here, too, similar strategies can be defined analogously to the heat pump.

In some embodiments, in the case of a first operating strategy, the storage strategy is determined in such a way that the combined heat and power plant is operated with heat-based control. In particular, this can be a so-called "conservative operating strategy". If the combined heat and power plant does not have a back-up gas boiler, for example, or the dimensioning of the energy store is not sufficient, then the combined heat and power plant can also again be operated with heat-based control and in particular fixedly offer the surpluses of electricity generation on the local energy market. Supplementarily, in a "conservative plus operating strategy", it can be provided that the initial quantity of energy in the energy store can also be made available as total flexibility for the next day.

In some embodiments, in the case of a second operating strategy, the storage strategy is determined in such a way that a predefined energy is provided within a predefined time interval. In particular, this can be a so-called "risky operating strategy". If the combined heat and power plant has a back-up gas boiler, an energy store with sufficient dimensioning, and/or also has the possibility of recooling surplus heat, then the entire quantity of heat of the following day can be converted into a quantity of electricity generation, in particular by means of the formula electricity generation=heat generation/thermal efficiency×electrical efficiency, and can be offered as a total block from, for example, 0:00-24:00 hr on the local energy market. Additionally, a "risky plus operating strategy" can be chosen, wherein in this case the consideration of the initial state of charge of the energy store can additionally be concomitantly taken into account.

In some embodiments, in the case of a third operating strategy, the storage strategy is determined in such a way that a predefined energy is provided within a predefined time interval having a multiplicity of time blocks, and within a respective time block. In other words, an equidistant and improved selection of time blocks can be carried out. Analogously to the operating strategy for the heat pump, it is possible either to distribute block offers equidistantly, as in the case of the "block operating strategy", or to determine their start and end times by means of the optimization method in order to minimize the risk, as has already been described in the optimized block selection operating strategy.

The operating strategies presented can also be applied in particular to further components of a multimodal energy system. In this case, there are in particular the following arrangements: electricity procurement unit+store+load. Alternatively cogeneration of electricity and a further form of energy, store+load in the further form of energy.

Overall, the different operating strategies of the electrical device presented enable the establishment of the possibility for offers in the case of heat pumps and combined heat and power plants with energy stores on the local energy market. There is a utilization of the high flexibility potential in the thermal "sector". In this case, it is possible to realize a cost saving for the individual participant. Furthermore, an improved resource utilization of renewable energies can be realized, as a result of which for example storage in an energy store of a different participant can be realized. Furthermore, it is possible to realize a minimization of the risk for the individual participant on the local energy market. Furthermore, it is possible to establish an individual choice of the trade-off between risk and performance.

In some embodiments, there is a computer program which is loadable directly into a memory of an electronic computing device of a magnetic resonance apparatus, comprising program means for carrying out the steps of the methods described herein when the program is executed in the electronic computing device of the magnetic resonance apparatus.

In some embodiments, there is an electronically readable data carrier with electronically readable control information which is stored thereon and which comprises at least one computer program as described herein and is configured in such a way that it carries out a method as described herein when the data carrier is used in an electronic computing device of a magnetic resonance apparatus.

In some embodiments, there is a network management system for a local energy network, comprising at least one electronic computing device, wherein the network management system is designed for carrying out a method as described herein. In particular, the method is carried out by means of the network management system.

Various configurations of the method should be regarded as analogous configurations of the computer program, of the electronically readable data carrier and of the network management system. In this case, the network management system has substantive features which enable the method or any analogous configuration thereof to be carried out.

Further features of the teachings herein are evident from the claims, the figures, and the description of the figures. The features and feature combinations mentioned above in the description and the features and feature combinations mentioned below in the description of the figures and/or shown solely in the figures are usable not only in the combination respectively indicated, but also in other combinations, without departing from the scope of the disclosure.

The FIGURE shows a block diagram of a local energy network 10 with an embodiment of a network management system 12 in a schematic view. The network management system 12 comprises at least one electronic computing device 14.

The local energy network 10 comprises an electrical device 16, the electrical device 16 comprising an energy store 18. In particular, the local energy network 10 can comprise a renewable energy source 20 and a superordinate network connection 22. The superordinate network connection 22 can be connected to a public network, for example, whereby electrical energy can be procured for the local energy network 10.

In an example method for operating the network management system for the local energy network 10, at least one operating strategy 24, 26, 28, 30, 32, 34 for an energy store 18 of the electrical device 16 of the local energy network 10 is determined depending on a decision criterion by means of an electronic computing device 14 of the network management system 12.

In some embodiments, a flexible storage strategy for storing energy in the energy store 18 is selected as the operating strategy 24, 26, 28, 30, 32, 34 by means of the electronic computing device 14, the storage strategy being determined depending on a predefined flexibility criterion of the electrical device 16 as the decision criterion.

In the following embodiment, the energy store 18 is designed in particular as a thermal energy store 18 and is designed in particular for storing thermal energy. The electrical device 16 can be for example a heat pump or a compression refrigeration machine. In some embodiments, the electrical device 16 can also be designed as a combined heat and power plant.

In particular, the FIG. shows that one operating strategy 24, 26, 28, 30, 32, 34 is selected from a multiplicity of operating strategies 24, 26, 28, 30, 32, 34 for the energy store 18 by means of the electronic computing device 14. In some embodiments, temporal shifting for consumption of the energy or for utilization of the energy within a predefined time interval is determined in the case of the predefined flexibility criterion.

A description is given below of, in particular, a corresponding operating strategy 24, 26, 28, 30, 32, 34 which can be carried out in particular for an electrical device 18 designed as a heat pump or as a compression refrigeration machine. In some embodiments, in the case of the heat pump or the compression refrigeration machine, depending on the storage strategy, electrical energy for generating energy for the energy store 18 is generated by the heat pump or the compression refrigeration machine by means of electrical energy uptake from the local energy network 10. In other words, the heat pump utilizes electricity to generate heat. The energy store 18 in the thermal circuit flexibilizes the possible operation of the heat pump in order to cover the thermal load. In particular, the operating strategy is designed for a so-called day ahead strategy, which describes in particular the electricity utilization for the following day.

In the case of a first operating strategy, the storage strategy can be determined in such a way that the energy store 18 has an energy value which is below an overcharging threshold value for the energy store 18 or above an undercharging threshold value for the energy store 18. In particular, this operating strategy 24, 26, 28, 30, 32, 34 can also be referred to as a "conservative operating strategy" 24. The least possible flexibility is offered in the case of the conservative operating strategy 24. In this case, the thermal load of each time interval, fixedly converted by the so-called COP (coefficient of performance) of the heat pump, is transferred to the local electricity market or the local energy network 10. What can be realized as a result is that the thermal load for each time interval can be covered and the energy store 18 is not in an undercharged or overcharged state.

Supplementarily, what can be regarded as a "conservative plus operating strategy" 26 is that in addition to the fixed thermal load, the energy store 18 still offers flexibility over the entire following day. If the energy store 18 has for example an initial state of charge of 40% and a total capacity of 100 kWh at the beginning of the following day, then over the entire day it is possible additionally also to procure 40%×100 kWh=40 kWh less, since the latter can be covered from the energy store 18. Alternatively, however, it is also possible to procure 60 kWh more heat. That is to say that it is possible to make a further block offer for buying electricity from 0:00-24:00 hr over 60 kWh, for example, with possibly a lower procurement price. If it is then worth procuring electricity at a specific time of the day owing to high renewable infeed and thus lower prices, for example, the energy store 18 can thus be charged by means of the heat pump. The 40 kWh less in terms of potential procurement could also be taken into account in the fixed thermal load curve. In this regard, either the thermal load that has to be covered can be specified as lower for each time interval or the buying of electricity can be reduced for specific time intervals in which high prices for the electricity procurement are presumed. In addition, it is then also possible to set a further block offer for electricity procurement of 40 kWh for the entire day.

Furthermore, in the case of a second operating strategy 24, 26, 28, 30, 32, 34, the storage strategy can be determined in such a way that a predefined energy is stored within a predefined time interval. In particular, a "risky operating strategy" 28 can thus be presented. Assuming that the flexibility made available by the energy store 18 is sufficient, in particular sufficient for any conceivable scenario, it is also possible simply to set only the entire quantity of heat required as a block offer on the local energy market, i.e. for the local energy network 10, as a procurement offer. That is to say that, if a total of 100 kWh heat are required on one day, these 100 kWh divided by an average COP of the heat pump as electricity procurement from 0:00-24:00 hr can be submitted as a block offer. In this case, the maximum procurement power can be restricted, for example by a maximum performance of the heat pump. In the case of energy stores 18 with excessively small dimensioning, this offer can result in overcharging or undercharging of the energy store 18, for example.

In the case of a "risky plus operating strategy" 30, for example, the risky operating strategy 28 can also be extended by the initial state of the energy store 18 also being concomitantly included as an offer. In particular, this has the same background as for the conservative plus operating strategy 26.

Furthermore, it can be provided that in the case of a third operating strategy 24, 26, 28, 30, 32, 34, the storage strategy is determined in such a way that a predefined energy is stored within a predefined time interval having a multiplicity of time blocks, and within a respective time block. This can be regarded in particular as a "block operating strategy" 32. In this case, alternatively, the user can select, for example, how many block offers are intended to be submitted for one day. In this regard, instead of in the risky operating strategy 28 for the entire day from 0:00-24:00 hr, for n=2 blocks, for example, it is possible to submit respectively an offer from 0:00-12:00 hr and an offer from 12:00-24:00 hr. If the number of block offers is equal to 1, then this method corresponds to the risky operating strategy 28. If the number of blocks is equal to the number of time intervals for the next day, then the method corresponds to the conservative strategy 24, in particular. The advantage of this method is, in particular, that overcharging or undercharging of the energy store 18 is reduced or avoided. An improved number of blocks could also be estimated from the storage capacity of the energy store 18, for example. If the storage capacity of the energy store 18 is five times greater than the maximum performance of the heat pump, for example, then it is not necessary to create an individual block and an individual offer for each time interval.

Furthermore, it can be provided that, in the case of a fourth operating strategy 24, 26, 28, 30, 32, 34, the storage strategy is determined in such a way that a number of the time blocks is determined by means of the electronic computing device 14 on the basis of an optimization method and a predefined energy is stored within a respective time block. This can be a so-called "optimized block selection operating strategy" 34. In this case, in particular, an improved trade-off between risk and performance can be produced. In particular, an optimization problem is formulated for the block selection. The participant can still determine the number of blocks in accordance with said participant's individual risk perception. These blocks now have flexible limits, however, which are optimized, that is to say that the start and end times of the blocks are variable. For each block, the method then determines what would be the worst possible result, i.e. to what extent the storage boundary conditions are exceeded. The sum of these exceedances of the storage boundary conditions of each block is then minimized in an optimization problem. The previously defined number of blocks is thereby distributed over the following day such that there is the lowest risk regarding non-fulfillment, but the greatest possible flexibility and thus also the greatest possible return can also be achieved.

In particular, the presented method can also be carried out for example in the case of an electrical device 16 provided as a combined heat and power plant. In particular, in this case, depending on the storage strategy, energy of the energy store 18 is then generated for generating electrical energy for the local energy network 10. In particular, the combined heat and power plant generates electricity and heat using a fuel. The operation of the combined heat and power plant can be flexibilized by the energy store 18. Instead of electricity procurement as in the case of the heat pump, however, here the main focus of attention is on electricity provision.

The conservative operating strategy 24 can then be set; if for example the combined heat and power plant does not have a back-up gas boiler or, in particular, the dimensioning of the energy store 18 is not sufficient, then the combined heat and power plant can also be operated again with heat-based control and only the surpluses of electricity generation are fixedly offered on the local energy market. Additionally, a conservative plus operating strategy 26 can also be offered, which analogously makes available the initial quantity of energy of the energy store 18 as total flexibility for the next day.

In the case of a second operating strategy 24, 26, 28, 30, 32, 34, the storage strategy can be determined in such a way that a predefined energy is provided within a predefined time interval. In particular, for example, a risky operating strategy 28 can thus be provided. If the combined heat and power plant has a back-up gas boiler, an energy store 18 with sufficient dimensioning, and/or also has the possibility of recooling surplus heat, then the entire quantity of heat of the following day can be converted into a quantity of electricity generation and can be offered as a total block from, for example, 0:00-24:00 hr on the local energy network 10. Furthermore, in the case of the risky plus operating strategy 30, the consideration of the initial state of charge of the energy store 18 can additionally be taken into account here as well.

Furthermore, it can be provided that in the case of a third operating strategy 24, 26, 28, 30, 32, 34, the storage strategy is determined in such a way that a predefined energy is provided within a predefined time interval having a multiplicity of time blocks, and within a respective time block. In other words, for example, an equidistant and optimum selection of blocks can be effected. The equidistant selection of blocks can be the block selection strategy 32, in particular, and the optimized selection of blocks can be the optimized block selection operating strategy 34, in particular. Analogously to the heat pump, it is possible either to distribute block offers equidistantly or to determine their start and end times in an optimized manner by means of an optimization problem in order to minimize the risk.

In particular, the provision of the different operating strategies 24, 26, 28, 30, 32, 34 enables the establishment of different offers in the case of heat pumps of combined heat and power plants with energy stores 18 in the local energy network 10. It is possible to realize a utilization of the high flexibility potential in the thermal "sector". Furthermore, it is possible to realize a cost saving for the individual participant. Furthermore, an improved resource utilization of renewable energies, represented here in particular by the renewable energy source 20, for example by storage in the energy store 18 of the other participant, in the present case in particular the electrical device 16, can be carried out.

Furthermore, it is possible to carry out a minimization of the risk for the individual participant on the local energy market 10. Furthermore, it is possible to effect an individual choice of the trade-off between risk and performance.

In some embodiments, there is a computer program, not illustrated, and an electronically readable data carrier, not illustrated. In other words, a method described herein can also be present in the form of the computer program which implements the method on the electronic computing device 14 when it is executed on the electronic computing device 14. Likewise, an electronically readable data carrier can also be present, which in particular is not illustrated, with electronically readable control information which is stored thereon and which comprises at least one computer program described and is configured in such a way that it carries out a method described when the data carrier is used in the electronic computing device 14 of a magnetic resonance apparatus.

The electronic computing device 14 can comprise in particular a computer, a microcontroller or an integrated circuit. In some embodiments, the electronic computing device 14 can comprise a real or virtual assemblage of computers, which can be referred to for example as cloud.

LIST OF REFERENCE SIGNS

10 local energy network
12 network management system
14 electronic computing device
16 electrical device
18 energy store
20 renewable energy source
22 superordinate network
24 operating strategy
26 operating strategy
28 operating strategy
30 operating strategy
32 operating strategy
34 operating strategy

What is claimed is:

1. A method for operating a network management system for a local energy network, the method comprising:
   electronically receiving a transmission from a superordinate network connection of the local energy network indicating an amount of energy present in an energy store of a device of the local energy network, wherein the energy store comprises one of: a battery, a hot water store, and a cold water store;
   assessing a set of decision criteria using an electronic computing device of the network management system;
   selecting between a first operating strategy and a second operating strategy for the energy store based on the decision criteria using an electronic computing device of the network management system;
   electronically transmitting the selected operating strategy from the network management system to the superordinate network connection; and
   issuing a control signal to operate the local energy network based on the selected operating strategy;
   wherein the first operating strategy comprises a flexible storage strategy based on the amount of energy present in the energy store; and
   wherein the set of decision criteria includes one or more of: include a predefined allowable flexibility for temporal shifting for utilization of energy by the electrical device, a purchase cost of energy for the local energy network, a purchase cost of energy from the local energy network, and stability of a power grid.

2. The method as claimed in claim 1, wherein determining the first operating strategy includes selecting one operating strategy from a multiplicity of operating strategies.

3. The method as claimed in claim 1, wherein the first operating strategy includes temporal shifting for consumption of the energy or for utilization of the energy within a predefined time interval.

4. The method as claimed in claim 1, wherein:
   the device comprises a heat pump or a compression refrigeration machine; and
   depending on the storage strategy, electrical energy for generating energy for the energy store is generated by the heat pump or the compression refrigeration machine by electrical energy uptake from the local energy network.

5. The method as claimed in claim 4, wherein the first operating strategy provides that the energy store has an energy value below an overcharging threshold value for the energy store or above an undercharging threshold value for the energy store.

6. The method as claimed in claim 4, further comprising selecting a second operating strategy wherein a predefined energy is stored within a predefined time interval.

7. The method as claimed in claim 4, further comprising selecting a third operating strategy wherein a predefined energy is stored within a predefined time interval having a multiplicity of time blocks, and within a respective time block.

8. The method as claimed in claim 7, further comprising selecting a fourth operating strategy wherein a number of the time blocks is determined by the electronic computing device on the basis of an optimization method and a predefined energy is stored within a respective time block.

9. The method as claimed in claim 1, wherein:

the electrical device comprises a combined heat and power plant; and depending on the selected storage strategy, energy of the energy store is used for generating electrical energy for the local energy network.

10. The method as claimed in claim 9, wherein the first operating strategy includes operating the combined heat and power plant with heat-based control.

11. The method as claimed in claim 9, further comprising selecting a second operating strategy wherein a predefined energy is provided within a predefined time interval.

12. The method as claimed in claim 4, further comprising selecting a third operating strategy wherein a predefined energy is provided within a predefined time interval having a multiplicity of time blocks, and within a respective time block.

13. An electronically readable non-transitory data carrier with electronically readable control information stored thereon, the information comprising a set of instructions for:

electronically receiving a transmission from a superordinate network connection of the local energy network indicating an amount of energy present in an energy store of a device of the local energy network, wherein the energy store comprises one of: a battery, a hot water store, and a cold water store;

assessing a set of decision criteria using an electronic computing device of the network management system;

selecting between a first operating strategy and a second operating strategy for the energy store based on the decision criteria criterion using an electronic computing device of the network management system;

electronically transmitting the selected operating strategy from the network management system to the superordinate network connection; and issuing a control signal to operate the local energy network based on the selected operating strategy;

wherein the first operating strategy comprises a flexible storage strategy based on the amount of energy present in the energy store; and wherein the set of decision criteria includes one or more of: a predefined allowable flexibility for temporal shifting for utilization of energy by the electrical device, a purchase cost of energy for the local energy network, a purchase cost of energy from the local energy network, and stability of a power grid.

14. A network management system for a local energy network, the system comprising:

an electronic computing device storing and executing control information comprising a set of instructions for:

electronically receiving a transmission from a superordinate network connection of the local energy network indicating an amount of energy present in an energy store of a device of the local energy network, wherein the energy store comprises one of: a battery, a hot water store, and a cold water store;

assessing a set of decision criteria using an electronic computing device of the network management system;

selecting between a first operating strategy and a second operating strategy for the energy store based on the decision criteria using an electronic computing device of the network management system;

electronically transmitting the selected operating strategy from the network management system to the superordinate network connection; and issuing a control signal to operate the local energy network based on the selected operating strategy;

wherein the first operating strategy comprises a flexible storage strategy based on the amount of energy present in the energy store; and wherein the set of decision criteria includes one or more of: include a predefined allowable flexibility for temporal shifting for utilization of energy by the electrical device, a purchase cost of energy for the local energy network, a purchase cost of energy from the local energy network, and stability of a power grid.

* * * * *